United States Patent
Charlier De Chily (10) Patent No.: US 6,656,980 B1
(45) Date of Patent: Dec. 2, 2003

(54) POLYMERIZATION METHOD BY DIELECTRIC HEATING OF UNSATURATED FATTY ACIDS, UNSATURATED FATTY ACID ESTERS, UNSATURATED HYDROCARBONS, OR UNSATURATED DERIVATIVES OF SAID PRODUCTS

(75) Inventor: Pierre Charlier De Chily, Irigny (FR)

(73) Assignee: Aldivia S.A., Saint Genis-Laval (FR)

( * ) Notice: Subject to any disclaimer, the term of this patent is extended or adjusted under 35 U.S.C. 154(b) by 0 days.

(21) Appl. No.: 09/807,982

(22) PCT Filed: Oct. 28, 1999

(86) PCT No.: PCT/FR99/02646

§ 371 (c)(1),
(2), (4) Date: Jul. 31, 2001

(87) PCT Pub. No.: WO00/26265

PCT Pub. Date: May 11, 2000

(30) Foreign Application Priority Data

Oct. 30, 1998 (FR) .............................. 98 13770

(51) Int. Cl.$^7$ ................................ C08F 20/62
(52) U.S. Cl. .................. 522/184; 522/186; 522/188
(58) Field of Search ................ 522/184, 186, 522/188

(56) References Cited

U.S. PATENT DOCUMENTS

| | | | | |
|---|---|---|---|---|
| 3,432,413 A | * | 3/1969 | Vanderhoff ................ | 524/832 |
| 4,020,267 A | * | 4/1977 | Park .......................... | 528/503 |
| 5,633,584 A | * | 5/1997 | Maryanskl et al. ......... | 324/300 |
| 5,650,477 A | * | 7/1997 | Parodi et al. ................ | 528/93 |
| 6,001,894 A | * | 12/1999 | Ottersbach et al. ......... | 522/149 |
| 6,049,736 A | * | 4/2000 | Stewart et al. .............. | 607/116 |

FOREIGN PATENT DOCUMENTS

| | | |
|---|---|---|
| DE | 1 543 013 | 11/1969 |
| FR | 2 199 754 | 4/1974 |

OTHER PUBLICATIONS

D Johnson, "Synthesis of High–Molecular Weight Polymers by Microwave Radiation", IBM Technical Disclosure Bulletin, vol. 18, No. 1, Jun. 1975, p. 221.

* cited by examiner

Primary Examiner—Nathan M. Nutter
(74) Attorney, Agent, or Firm—Arent Fox Kintner Plotkin & Kahn PLLC (57) ABSTRACT

This invention relates to a process of polymerization of unsaturated fatty acids, esters of unsaturated fatty acids, unsaturated hydrocarbons or esters of unsaturated hydrocarbons, or unsaturated derivatives of these products by dielectric heating, as well as to the polymers obtained and uses of these polymers. The polymerization process is characterized by the fact that the reagent or reagent mixture is subjected to dielectric hearting to effect polymerization.

33 Claims, 12 Drawing Sheets

REFERENCE IT 1:
3% Triglyceride Polymers

FIG. 1

REFERENCE IT 2:
3% Triglyceride Polymers

```
CHANNEL A      INJECTOR    08/06/00 00:25:53   STORAGE IN BATCH # 80
               II  I
              II  0
                  4,29
             6,10
                              6,69
                  8,35                                          7,25
             9,05

ER 0   9,83
```

DATA SAFEGUARDED IN BATCH # 80

REF3%                          08/06/00 00:25:53   CHANNEL="A"   PS=1.
FILE 1.         METHOD 0.    TEST 126       INDEX 126       BATCH 80

| PIC# | AREA% | Holding Time | Area | Bandwidth at mid-height | | |
|---|---|---|---|---|---|---|
| 1 | 0,019 | 4,29 | 2548 | 01 | | |
| 2 | 0,633 | 6,1 | 83294 | 02 | 0,637 % | } 3,684% TG polymers + dimers |
| 3 | 3,027 | 6,69 | 398466 | 02 | 3,047 % | |
| 4 | 95,663 | 7,25 | 12594755 | 08 | 96,316 % | |
| 5 | 0,352 | 8,35 | 46293 | 05 | 100 % | |
| 6 | 0,044 | 9,05 | 5858 | 05 | | |
| 7 | 0,262 | 9,83 | 34542 | 01 | | |
| TOTAL | 100, | | 13300279 | | | |

FIG. 2

REFERENCE IT 3:
7.5% Triglyceride Polymers

DATA SAFEGUARDED IN BATCH # 93

REF7,5%  08/07/00 00:10:16  CHANNEL="A"  PS=1.
FILE 1.  METHOD 0.  TEST 139  INDEX 139  BATCH 93

| PIC# | AREA% | Holding Time | Area | Bandwidth at mid-height | | |
|------|-------|--------------|------|-------|---|---|
| 1 | 0,351 | 6,1 | 47236 | 02 | 0,361 % | 7,789% TG polymers + dimers |
| 2 | 7,215 | 6,7 | 969610 | 02 | 7,428 % | |
| 3 | 89,56 | 7,24 | 12035742 | 09 | 92,211 % | |
| 4 | 0,216 | 8,33 | 29047 | 05 | 100 % | |
| 5 | 2,658 | 9,81 | 357184 | 03 | | |
| TOTAL | 100, | | 13438819 | | | |

FIG. 3

DATA SAFEGUARDED IN BATCH # 92

REF 7,5%  08/06/00 23:54:43 CHANNEL="A"  PS=1.

FILE 1.  METHOD 0.  TEST 138  INDEX 138  BATCH 92

| PIC# | AREA% | Holding Time | Area | Bandwidth at mid-height | | |
|---|---|---|---|---|---|---|
| 1 | 0,349 | 6,09 | 47114 | 02 | 0,360 % ⎫ | 7,787% TG polymers + dimers |
| 2 | 7,192 | 6,69 | 972017 | 02 | 7,427 % ⎭ | |
| 3 | 89,296 | 7,22 | 12068838 | 08 | 92,213 % | |
| 4 | 0,215 | 8,31 | 29071 | 05 | 100 % | |
| 5 | 2,949 | 9,78 | 398532 | 03 | | |
| TOTAL | 100, | | 13515572 | | | |

FIG. 4

SAMPLE 106

| E106 | | | 08/07/00 01:03:55 | | CHANNEL="A" | PS=1. |
|---|---|---|---|---|---|---|
| FILE 1. | METHOD 0. | TEST 117 | | INDEX 177 | | BATCH 95 |
| PIC# | AREA% | Holding Time | Area | Bandwidth at mid-height | | |
| 1 | 24,075 | 6,08 | 3470634 | 02 | 27,600 % ⎤ | 65,535% TG polymers + dimers |
| 2 | 35,707 | 6,63 | 5147610 | 02 | 40,935 % ⎦ | |
| 3 | 27,446 | 7,22 | 3956637 | 02 | 31,465 % | |
| 4 | 12,773 | 8,31 | 1841311 | 03 | 100 % | |
| TOTAL | 100, | | 14416192 | | | |

SAMPLE 107

FIG. 7

SAMPLE 107

FIG. 8

SAMPLE 162

CHANNEL A     INJECTOR   08/07/00 02:32:38    REPROCESSING OF THE CARD STORED IN BATCH # 98

E162                        08/07/00 02:32:38   CHANNEL="A"    PS=1.
FILE 1.      METHOD 0.    TEST 193      INDEX 195       BATCH 98

| PIC# | AREA% | Holding Time | Area | Bandwidth at mid-height | |
|---|---|---|---|---|---|
| 1 | 33,662 | 6,06 | 5543485 | 02 | TG polymers |
| 2 | 37,893 | 6,66 | 6240182 | 02 | TG dimers |
| 3 | 28,445 | 7,21 | 4684318 | 03 | TG |
| TOTAL | 100, | | 16467985 | | |

FIG. 9

SAMPLE 162

E162  08/07/00 02:50:58 CHANNEL="A"  PS=1.

FILE 1.  METHOD 0.  TEST 194  INDEX 196  BATCH 99

| PIC# | AREA% | Holding Time | Area | Bandwidth at mid-height | | |
|---|---|---|---|---|---|---|
| 1 | 33,701 | 6,12 | 5847986 | 02 | TG | polymers |
| 2 | 38,011 | 6,72 | 6595803 | 02 | TG | dimers |
| 3 | 28,288 | 7,26 | 4908778 | 03 | TG | |
| TOTAL | 100, | | 17352567 | | | |

FIG. 10

SAMPLE 163

FIG. 11

SAMPLE 163

FIG. 12

POLYMERIZATION METHOD BY DIELECTRIC HEATING OF UNSATURATED FATTY ACIDS, UNSATURATED FATTY ACID ESTERS, UNSATURATED HYDROCARBONS, OR UNSATURATED DERIVATIVES OF SAID PRODUCTS

Process of polymerization by dielectric heating of unsaturated fatty acids, esters of unsaturated fatty acids, unsaturated hydrocarbons, or unsaturated derivatives of these products.

This invention relates to a process of polymerization of unsaturated fatty acids, esters of unsaturated fatty acids, unsaturated hydrocarbons or esters of unsaturated hydrocarbons, or unsaturated derivatives of these products by dielectric heating, as well as to the polymers obtained and uses of these polymers, that is, heating at microwave frequencies or radio frequencies.

Compounds obtained by polymerization of fatty acids or of esters of unsaturated fatty acids are well known. The polymers obtained on the basis of unsaturated vegetable oil, in particular, may be cited. Polymerization processes make use of double bonds of fatty acids or, after initial treatment (isomerization), conjugate bonds.

Current processes for preparation of these polymers such as blown oils or stand oils are characterized by use of heat (thermal polymerization) in the presence of catalysts (homogenous or heterogenous). Use of catalysts such as oxygen or anthraquinone makes it possible to obtain polymers of high viscosity but ones which are highly reactive after their preparation, a feature of interest only for areas of application such as paints in which the product is required to dry (reticulation phenomenon).

In areas such as lubrication, cosmetics, or pharmacology, on the other hand, there is a demand rather for polymers stable under external restraints (oxygen, water, etc). The restraint of eliminating traces of catalysts is sometimes added in cosmetics and in pharmacology.

Polymers have been developed on the basis of this fact: they are prepared on the basis of triglycerides at least one fatty acid of which comprises at least one unsaturated compound (conjugate or not), preferably without a catalyst and in an atmosphere devoid of oxygen. These developments use processes such as heating belts, gilotherms [heat transfer fluids], or resistors, which processes take much time, something which generally prevents obtaining polymers exhibiting high viscosities; they are also costly because of the investment amounts required.

The invention makes it possible to reduce these major disadvantages. Use of microwaves or radio frequencies yields dual benefits; on the one hand the microwave or high-frequency energy interacts immediately at the molecular level, and on the other less energy is required (it is the molecules themselves which, when polarized by the electric fields of the microwaves or radio frequencies, convert electromagnetic energy to heat).

The applicant has found, as a first feature of the invention, that polymerization of unsaturated fatty acids, of unsaturated hydrocarbons, of unsaturated derivatives of these products, or of a mixture of them by dielectric heating, that is, by means of microwaves or radio frequencies, preferably microwaves, makes it possible to obtain high-viscosity products with more favorable reaction periods.

Hence the invention relates to the general process of polymerization of unsaturated fatty acids, unsaturated fatty acid esters, unsaturated hydrocarbons, and similar products, by dielectric heating, that is, by means of microwave frequencies or radio frequencies, preferably microwaves.

Use of microwave energy in industry is already known, but in a different field and to cope with different problems, especially in the area of epoxy resins and the like.

Microwaves or radio frequencies have not been described for polymerization of products of the kind described above, and of squalene in particular.

Nor has a description been given of the possibility of replacement of use of squalane in cosmetics by a polymer of squalene obtained at lower cost by the process claimed for the invention.

The gain in time and energy combined with lower investment cost permits the assertion that the dielectric heating process is faster and more cost effective.

This invention may be applied for polymerization of unsaturated fatty acids, esters of unsaturated fatty acids, unsaturated hydrocarbons, plant oils, animal oils and fats, and their unsaturated derivatives. These products may be used in raw or refined form, optionally after undergoing preliminary treatment.

The reaction may involve a single reagent or a mixture of reagents in varying proportions.

Polymerization is carried out by subjecting the reagent or reagents to dielectric heating, that is, heating at frequencies ranging from around 30 Ghz to around 3 MHz. Microwave frequencies, which are preferred, range from around 30 GHz to around 300 MHz, preferably 2.45 Ghz (authorized frequency with 2-percent tolerance) or 915 MHz (authorized frequency with 1.4-percent tolerance). The radio frequencies range from around 300 MHz to around 3 MHz, preferably 13.56 MHz (authorized frequency with 0.05-percent tolerance) or 27.12 MHz (authorized frequency with 0.6-percent tolerance).

The reaction temperatures range from 200 to 400° C., by preference 230 to 350° C., with a temperature rise of three to 60 minutes, by preference three to 20 minutes, over a total reaction period of 15 minutes to 15 hours, preferably 15 to 360 minutes, by preference 15 to 120 minutes, with or without catalyst, preferably without catalyst, under constant agitation, in an inert atmosphere or not, depending on the result desired.

The polymerization reagents for this invention may be chosen from among animal and plant oils and fats and from among the polyterpenes some of which are derived from the oils and fats in question.

Sperm whale oil, dolphin oil, whale oil, seal oil, sardine oil, herring oil, shark oil, cod liver oil, neat's-foot oil and fats of beef, pork, horse, and sheep (tallow) may be cited as oils or fats of animal origin.

As oils of plant origin one may mention, among others, rapeseed oil, sunflower oil, peanut oil, olive oil, walnut oil, corn oil, soya oil, flaxseed oil, hemp oil, grapeseed oil, coconut oil, palm oil, cottonseed oil, babassu oil, jojoba oil, sesame oil, castor oil, dehydrated castor oil, hazelnut oil, wheat germ oil, borage oil, primrose oil, tall oil.

Use may also be made of the components of animal or plant oils such as scalene extracted from the nonsaponifiable components of plant oils (olive oil, peanut oil, rapeseed oil, corn germ oil, cottonseed oil, flaxseed oil, rice bran oil) or contained in large amounts in shark oil.

As unsaturated fatty acids use may be made, singly or in mixture, as nonrestrictive examples, of one or more of monounsaturated fatty acids such as oleic acid, palmitoleic acid, myristic acid, petroselenic acid, erucic acid, etc; one or more of polyunsaturated fatty acids such as linoleic acid, alpha-linoleic and gamma-linoleic acids, arachidonic acid; one or more of acids comprising conjugate dienes or conjugate trienes such as licanic acid or the isomers of linoleic or linolenic acids; one or more of the acids comprising one or more hydroxyl groups such as ricinoleic acid.

As esters of unsaturated fatty acids use may be made, singly or in mixture, as nonrestrictive examples, of one or more of the esters obtained by esterification between a monoalcohol and/or a polyol (singly or in mixture), and at least one unsaturated fatty acid. As nonrestrictive examples of monoalcohol mention may be made of methanol, ethanol, or butanol; as nonrestrictive examples of polyols, glycerol, sorbitol, neopentylglycol, trimethylpropane, pentaerythritol, glycol, ethylene glycol, polyethylene glycol. Waxes and phospholipids may also be used as fatty acid esters.

As unsaturated hydrocarbons use may be made, singly or in mixture, as nonrestrictive examples, of one or more of the terpenic hydrocarbons, oxygenated or not, that is, one or more isoprene polymer, one or more isobutene polymer, styrene, ethylene, butadiene, isoprene, propene, or one or more of the copolymers of these alkenes.

Unsaturated derivatives of these compounds may be obtained, for example, by activation of residual unsaturated compounds by any method known to the expert, such as hydrogenation, hydroxylation, epoxydation, or sulfonation.

By preference use will be made as reagent or reactive mixture of one or more esters of unsaturated fatty acids or their derivatives comprising at least one unsaturated compound (amides, partially hydrogenated fatty acid esters, polyoxyethylenated fatty acid esters, etc), singly or in mixture with one or more unsaturated hydrocarbons.

The expert will understand that the invention may also be applied to analogous compounds, that is, to ones whose chemical structure authorizes the same action of microwave or radio frequencies with regard to polymerization.

A particularly interesting application of the invention is to be found in relation to squalene or spinacene. What is involved is a precursor of cholesterol found among other places in the liver of sharks. It is known for its highly emollient, antifungal, and antibacterial properties. In addition, it has a nonfat feel, an aspect which would present a real advantage in the area of cosmetic products.

Patent FR 2 576 309, which deals with the refining of paraffins, is known in this context. A manufacturing process described in patent EP 0 228 980 is also known.

Also of the state of the art is hydrogenation of the six double bonds of squalene to produce squalane, which is useful in cosmetology. However, this process is by nature very cumbersome and accordingly presents a problem for industry.

Lastly, use of byproducts resulting from refining of olive oil as a basis to obtain the esters, followed by distillation of the esters to obtain the squalene which may be recovered, is a state-of-the art process.

As is to be seen, squalene and its derivatives have been extensively studied; this is indicative of the value of these products to industry.

As indicated above, these products are of great potential interest in the field of cosmetics. However, if polymerization of squalene to obtain a polymer usable in cosmetics is undertaken, the processes referred to above use very costly heating.

Use of microwaves or high-frequency waves as claimed for the invention in order to polymerize squalene resolves the problems indicated in the foregoing.

A more detailed description is given below of application of the invention.

Squalene or spinacene, of empirical formula $C_{30}H_{80}$, is a polyterpene having the following developed formula:

Human sebum contains more than 10 percent of this substance; hence its importance in dermatology and cosmetology. In effect, squalene softens the skin (emollient nature) and participates in its protection (as antibacterial, antifungal). It is a good vehicle for active principles (as an application in dermatology). But cosmetologists make use rather of squalane (hydrogenated squalene) because it is saturated and thus more stable toward oxidation. Hydrogenation of squalene is a costly process which yields little differentiation from traditional hydrocarbons such as oils and paraffin waxes.

As a second and advantageous characteristic of the invention the applicant proposes replacing squalane with squalene, which is polymerized by means of microwave frequencies or radio frequencies, either singly or in combination with one or more unsaturated fatty acids or esters of unsaturated fatty acids or plant or animal oils or other unsaturated hydrocarbons. Since squalane is sometimes replaced with a hydrogenated polyisobutene (unsaturated hydrocarbon), the squalene may be replaced with a polyisobutene without going beyond the scope of the present invention.

These oils and fats of animal or plant origin, as well as their derivatives, may be subjected to preliminary treatment in order to make them more reactive or, on the contrary, less reactive. The invention relates both to an isolated reagent and to a reaction mixture including two or more components or reagents. These reaction mixtures may have components in equal proportions, or some components may be present in higher proportions.

The polymerization is effected by dielectric heating of the reagent or reagent mixture, that is, by heating at microwave frequencies or radio frequencies. The temperature selected ranges preferably from 200 to 400° C., especially from 220 to 350° C.

Use of microwave frequencies or radio frequencies makes it possible to impose a temperature rise time (that is, the time required for transition from ambient temperature to polymerization temperature) ranging from three to 60 minutes, preferably from three to 20 minutes.

Reduction of the temperature rise time makes it possible to create ideal polymerization conditions for the reagent and thus to reduce the total reaction time but uses more power over a short period.

The total reaction time depends on the reagent or reagents used and on the viscosity it is desired to produce, and ranges preferably from 15 minutes to 15 hours, preferably from 15 to 360 minutes, and by special preference from 15 to 120 minutes. The total reaction time may be reduced by using a higher temperature. However, temperatures which are too high may result in degradation of the products.

Hence a choice will have to be made of a reaction temperature/total reaction time combination which permits optimum polymerization in a short time but without excessive energy consumption and with no risk of degradation of the product. The expert will know how to optimize these parameters by means of routine tests, in accordance with the criteria indicated below.

The polymerization may be carried out with or without catalysts. The catalysts may be homogenous or heterogenous. For example, anthraquinone, sulfur anhydride, or the soluble salts of nickel may be used as homogenous catalysts. Examples of heterogenous catalysts are zeolites or ion exchange resins in acid form. Use will be made preferably of catalysts specially adapted to radio frequencies or microwave frequencies, such as clays of the montmorillonite or bentonite type, which have the effect of increasing molecular interaction when subjected to dielectric heating.

It will be made certain that agitation is sufficient to ensure a uniform temperature in the reaction vessel.

The polymerization may be conducted in a normal or an oxygen-rich atmosphere (for example, for making blown oils), or, preferably in an inert atmosphere (in the presence of nitrogen, argon, helium, or other rare gases employed singly or in mixture). The process is conducted preferably under low pressure, with care taken to renew the atmosphere.

In the case of squalene the invention consists of reducing the number of unsaturated bonds in the polymerizing agent, singly or in mixture with at least one of the reagents cited above, by means of the process mentioned above, this making it possible to obtain an oxidation-stable polymer whose viscosity depends on the degree of polymerization. In this way a second functionality is imparted to the squalene. Hence the polymer obtained, in addition to its emollient aspect, will be consistency factor in cosmetic product formulations. In addition, the polymerization process in question is less costly than the hydrogenation process involving use of costly catalysts.

Polymerization operations may be carried out by batches (discontinuously), but it is advantageous to utilize continuous processes for limited-time reactions.

To halt the polymerization it suffices to lower the reaction mixture temperature so as to keep the latter below the reaction temperature. This depends to a significant extent on the reaction mixture. It is to be noted that use of microwaves or radio waves is of particular advantage at this point in the process because there is no inertia due to the walls of the reaction vessel.

A series of supplementary stages makes it possible to refine the polymer in keeping with the needs of the end user. The neutralization number of the polymer produced may be lowered. The polymer may be deodorized, its moisture content may be reduced, or it may be decolorized.

These refining stages are well known to the expert. A number of them may be mentioned.

Lowering of the neutralization number, which reflects the number of free carboxylic acids present in the polymer, is effected by adding in excess agents selected from among alcohols, epoxides, hydroxides, and glycidyl esters, singly or in combination. The acidity is thus neutralized by synthesizing esters, salts, etc. In order to do this it suffices to lower the temperature of the reaction mixture to the reaction temperature of these esters, salts, etc.

It is to be noted that time Will be gained for this stage thanks to the microwave frequencies or radio frequencies, since the reaction time will range from three minutes to three hours, depending on the polymer, as against five times as long on the average with conventional heating processes.

Deodorization may be effected by steam distillation. This operation is carried out at temperatures ranging from 50 to 240° C.

After this stage the moisture content is reduced by conventional heating processes (heating by conventional process to reach the boiling point of water and distillation under vacuum, or use of drying compounds) or, preferably, by using dielectric heating, that is, by using microwave frequencies or radio frequencies which cause water molecules to react and, again, yield a saving of time. The expert will know how to determine the appropriate reduction of the moisture content in accordance with the application considered, for example, a content below 500 ppm is desirable for lubricants.

Whenever the moisture content of the reagent or reagent mixture is considered to be too high, the moisture content is reduced before the polymerization stage is carried out; as described above, use may be made of conventional heating methods or, preferably, dielectric heating. For example, by following this procedure whenever the reaction mixture is made up of esters, one achieves significant reduction in the hydrolysis phenomena responsible for a high neutralization number at the end of polymerization.

Decolorization may be effected by using oxygenated water or by using bleaching earth or by passing the polymer obtained through activated charcoal filters.

The polymers obtained may be used, as non-restrictive examples:
  for preparation of paints, glues, adhesives if siccative reagents such as linseed oil (production of standoils or blown oils) or mixtures of siccative reagents are selected,
  for preparation of lubricants or performance additives for lubricants if sunflower oil, soybean oil, or canola oil are selected,
  for preparation of cosmetic products if a mixture of agents is selected containing, for example, 0 to 100 percent by weight squalene or polyisobutene for 100 to 0 percent fatty acid esters or unsaturated plant oils (sunflower, soybean, rapeseed, castor, etc),
  for preparation of plastics, rubber, etc as plasticizing additives.

The following by no means restrictive examples illustrate the advantages and the range of the invention. Their purpose is to demonstrate that use of microwaves or radio frequencies makes spectacular acceleration of the polymerization rate of reagents possible. Addition of the stages of refining which, while of interest, contribute little to the demonstration, has for this reason been foregone.

Polymers were prepared using a Synthewave (™) microwave oven made by the Prolabo Company. This device is equipped with a waveguide making it possible to focus microwave energy on the reagents. It yields: 300 W per 600 W of consumption. The wavelength is 2.45 Ghz. 100 ml of the reagents tested were placed in 250-ml quartz reaction vessel. The machine was controlled so that the temperature rise would be identical to the temperature rise observed in the conventional method. This demonstrates that microwaves exert a catalytic effect. However, in the case of microwaves it is possible to reduce the temperature rise time by as much as 80 percent relative to conventional heating methods.

The same experiment was set up, but conducted with conventional heating. 100 ml of the reagents tested were placed in a 250-ml reaction vessel heated externally by resistors.

The agitation rate ranges from 60 to 100 rpm in both instances (variation with increase in viscosity).

| Preparation | | | Microwave Heating | | | Conventional Heating | | |
|---|---|---|---|---|---|---|---|---|
| Reagents | T° C | Duration (min) | Aspect | Viscosity (Pa.s) | Iodine Value (g 12/100 g) | Aspect | Viscosity (Pa.s) | Iodine Value (g 12/100 g) |
| Sunflower | 310 | 120 | Viscous | 8.9050 | 68 | Liquid | 0.4098 | 97 |
| Sunflower | 290 | 120 | Liquid | 2.0541 | 80 | Liquid | 0.1542 | 100 |
| Sunflower | 290 | 120 | Liquid | 0.2502 | 99 | Liquid | 0.0389 | 120 |
| Sunflower | 310 | 60 | Liquid | 0.0423 | 90 | Liquid | 0.0423 | 115 |
| Rapeseed | 310 | 60 | Liquid | 0.2915 | 94 | Liquid | 0.0356 | 107 |
| Sunflower + 3 g of montmorillonite | 270 | 25 | Liquid | 0.1043 | 106 | Liquid | 0.0321 | 123 |
| 75% Sunflower + 25% Squalene | 290 | 60 | Liquid | 0.5778 | 102 | Liquid | 0.0414 | 156 |
| 50% Sunflower + 50% Squalene | 290 | 120 | Liquid | 0.3365 | 160 | Liquid | 0.0261 | 213 |

The temperature indicated is mean temperature after the temperature rise. It is to be noted that the temperature gradient observed in the case of heating by microwave frequencies is inversely proportional to the temperature gradient observed in the case of conventional heating. In the first case the temperature at the walls of the reaction vessel is lower than that in the center of the reaction mixture. The opposite is true in the second case. Hence it is important to take a mean temperature.

The viscosity is dynamic viscosity at 40° C.; the results are expressed in Pa.s. These measurements were made with a Carry Med (™) rheometer. The result indicates the formation of polymers.

The iodine value permits measurement of unsaturated compounds which have reacted. The NF ISO standard was used.

The temperature level of the reaction mixture appears to exert a real effect on the final viscosity of the product. It is found in all cases that use of microwave frequencies results in significant reduction of the reaction time.

Cosmetics Application

We modified a hand cream formula by replacing all or part of the following ingredients with polymerized sunflower oil (HTP) by dielectric heating at 300° C. for one hour:

| COMPONENT | FUNCTION | Initial Formula % | Modified Formula % |
|---|---|---|---|
| HTP | Substitute | 0 | 5 |
| Stearic Alcohol | Emulsifier | 5 | 4 |
| Stearic Acid | Emulsifier | 0.4 | 0.2 |
| Karite Butter | Emollient/Emulsifier | 1 | 0 |
| Water | | 66.6 | 73.8 |
| Glycerin | Hydrating "emulsifier" | 20 | 10 |
| Other Ingredients | Various additives | 7 | 7 |

The following are the benefits of the modified formula:
it lathers less when applied;
it is more emollient (it makes the skin supple);
it forms a barrier which preserves hydration of the skin.
Polymerized sunflower oil is of advantage to the person formulating cosmetics, since.

the emollient capacity of the formula is greater when the amount in water is increased;
HTP possesses power to confer viscosity;
HTP is a co-emulsifier (thickener).

Analysis of the Polymers

We employed high-performance liquid chromatography (IUPAC 2.58) to determine the triglyceride polymer content of four samples of polymerized sunflower oil having the same viscosity (460 Cst at 40° C.) but produced by means of dielectric heating (DH) as claimed for the invention or by means of conventional heating (CT).

| TRIGLYCERIDE POLYMERS DETERMINED BY HIGH-PERFORMANCE LIQUID CHROMATOGRAPHY (HPLC) | | | | |
|---|---|---|---|---|
| Reference Sample | DH/CH | TG polymer content, % | TG dimer content, % | TG content, % |
| E 106 | CH | 27.5 | 40.9 | 31.5 |
| E 107 | DH | 24.9 | 75.1 | |
| E 162 | CH | 33.7 | 37.9 | 28.4 |
| E 163 | CD | 21.7 | 52.5 | 25.8 |

Figure 1:
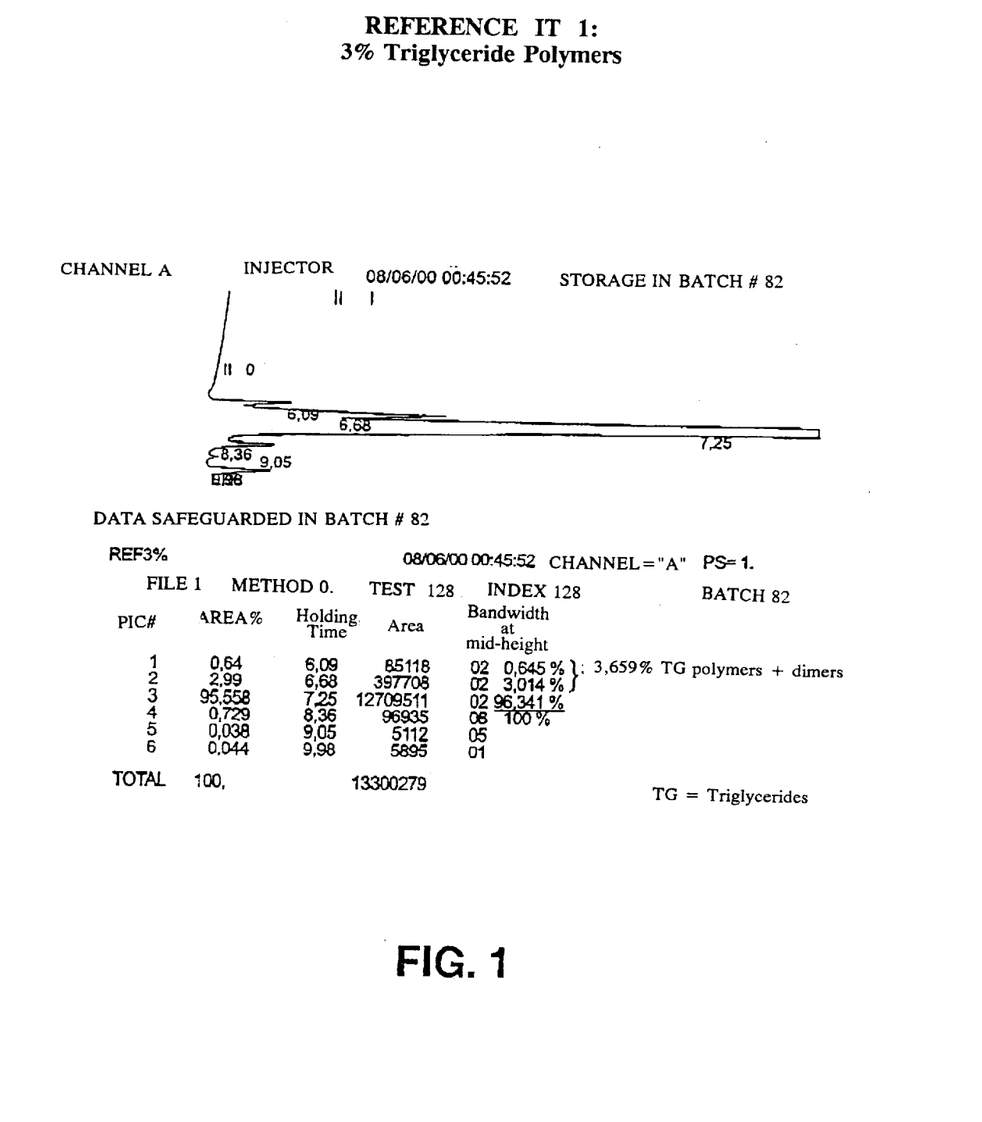
FIGS. 1 to 12 attached represent the chromatograms obtained under the conditions indicated in each of the figures for convenience of reference.
Figure 2:
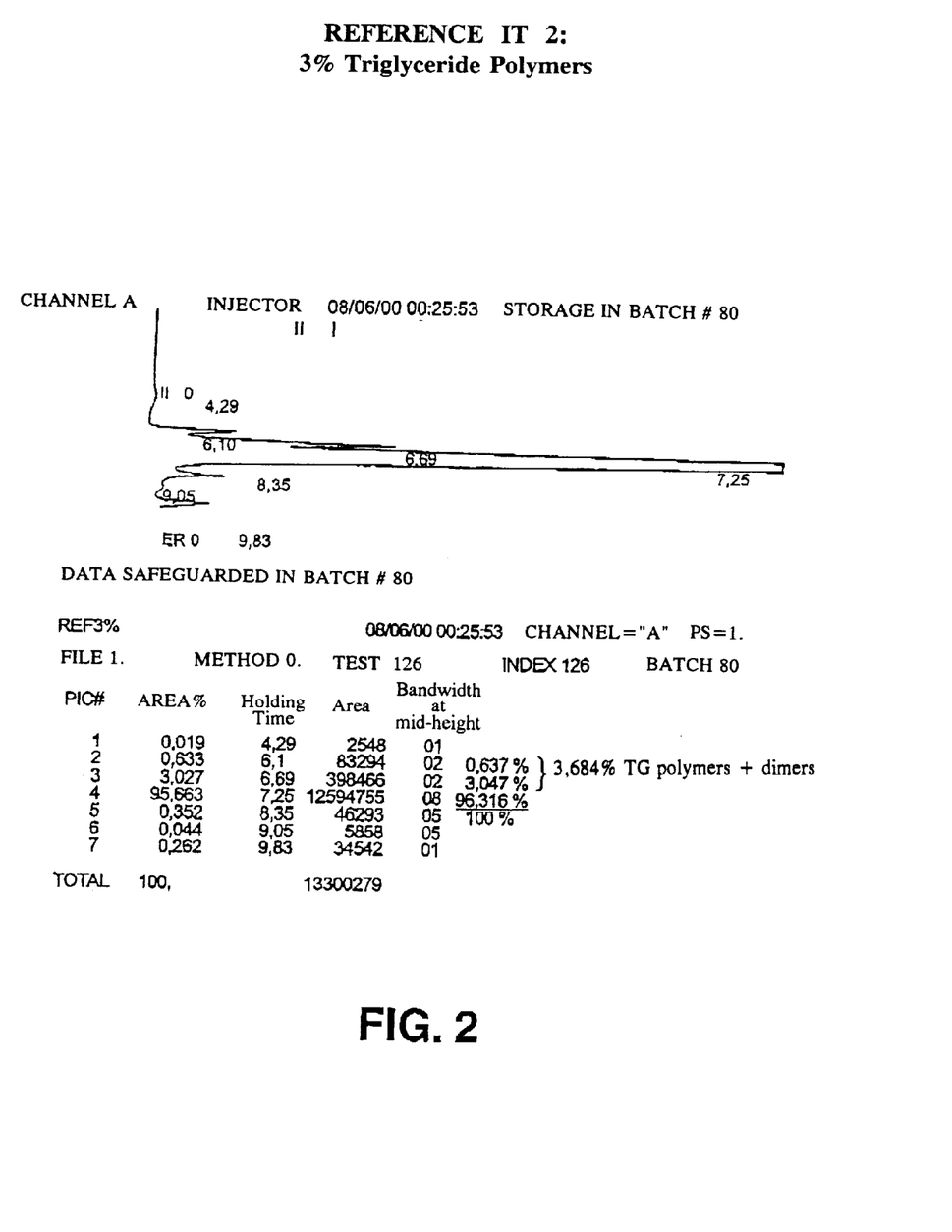
Figure 3:
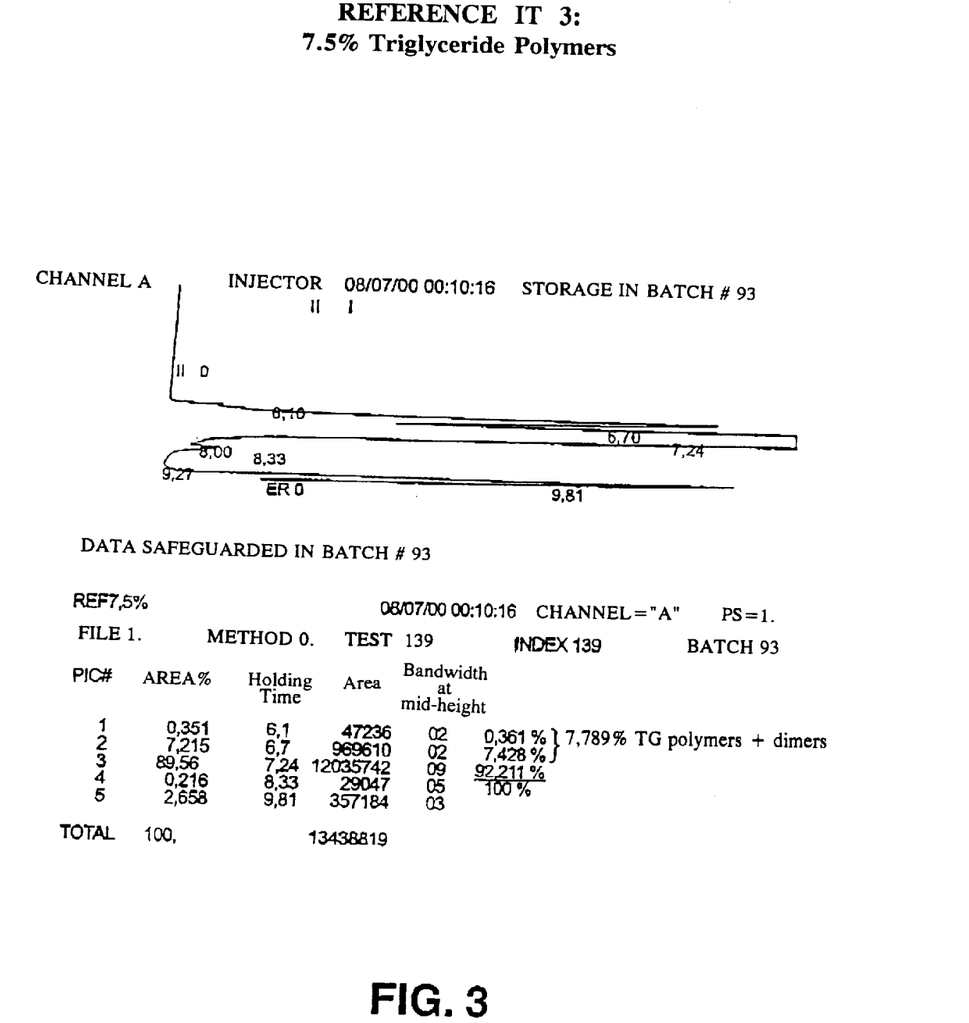
Figure 4:
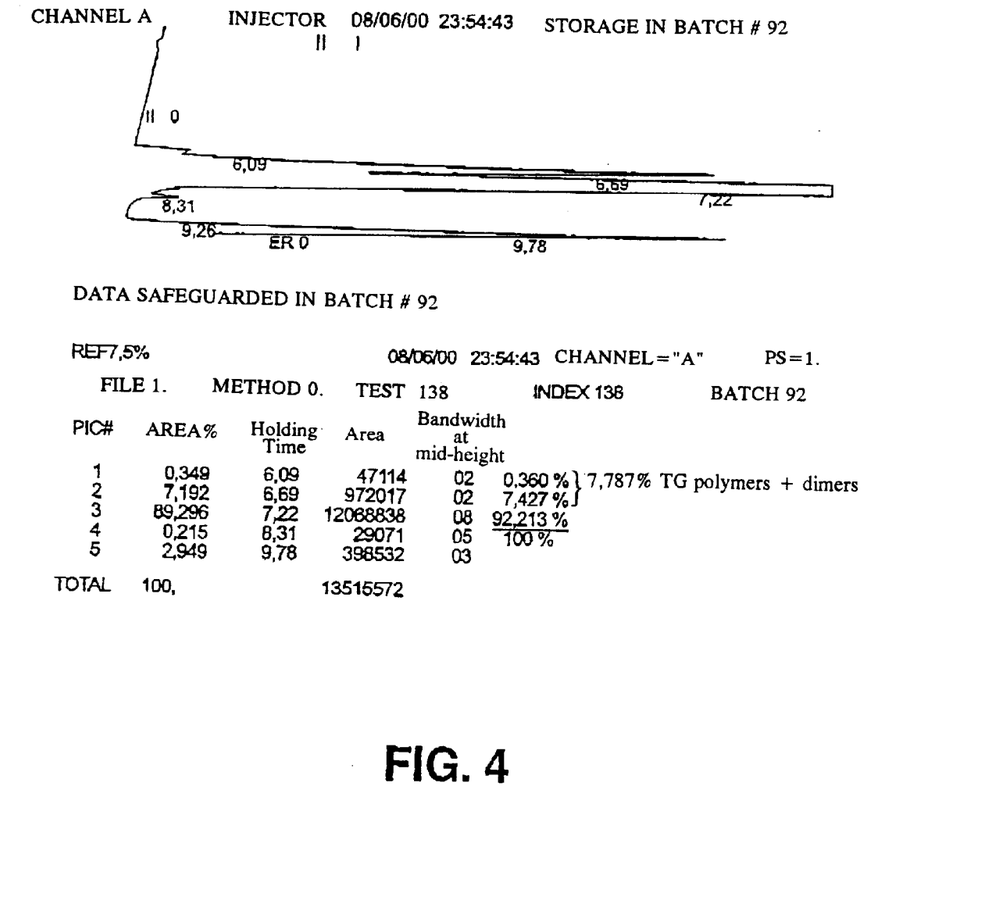
Figure 5:
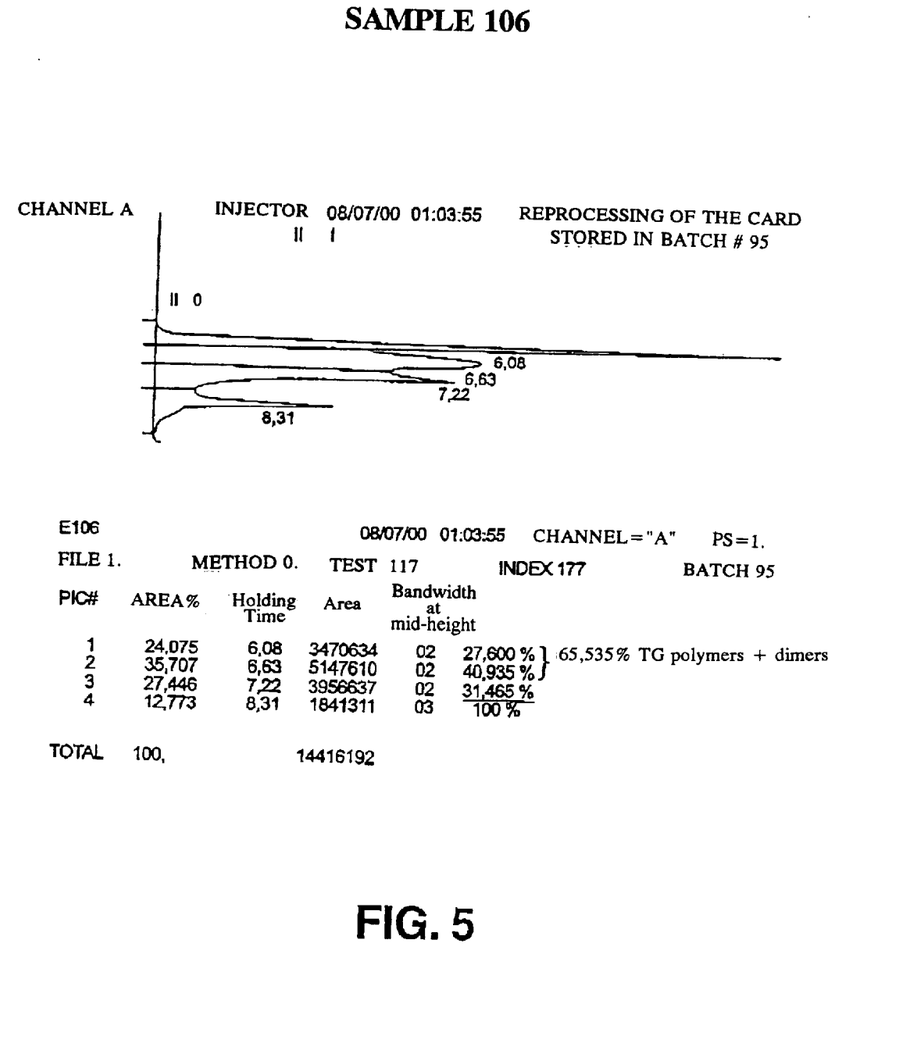
Figure 6:
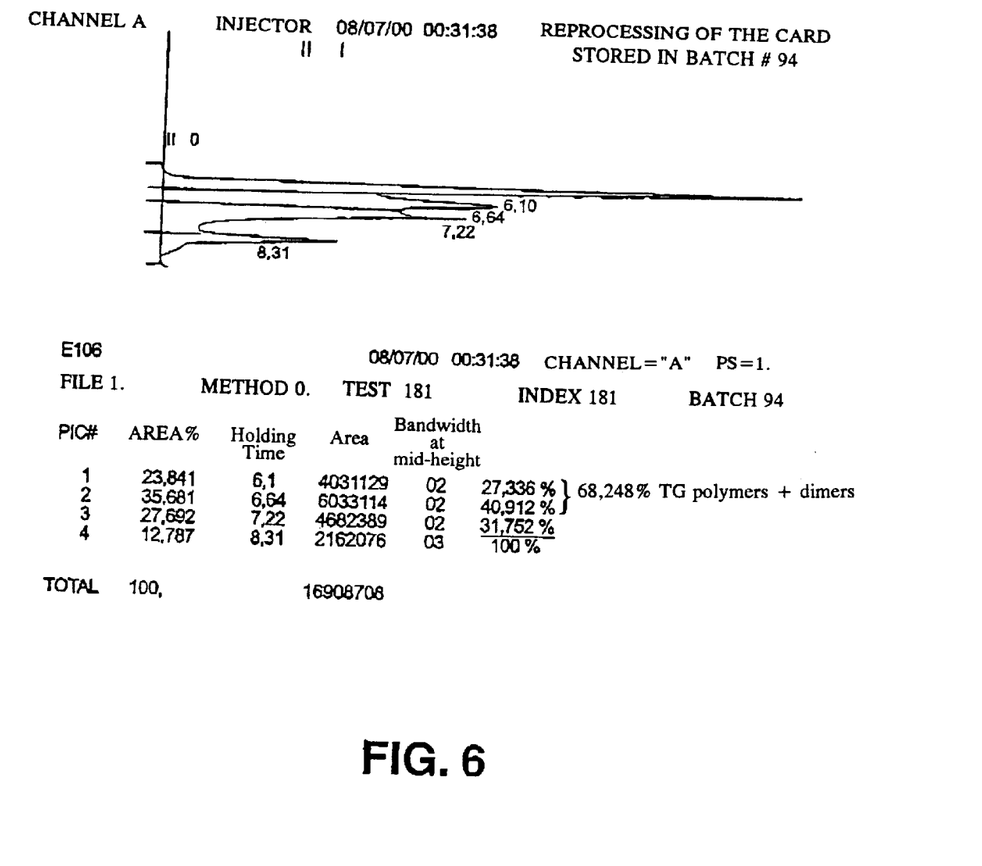
Figure 7:
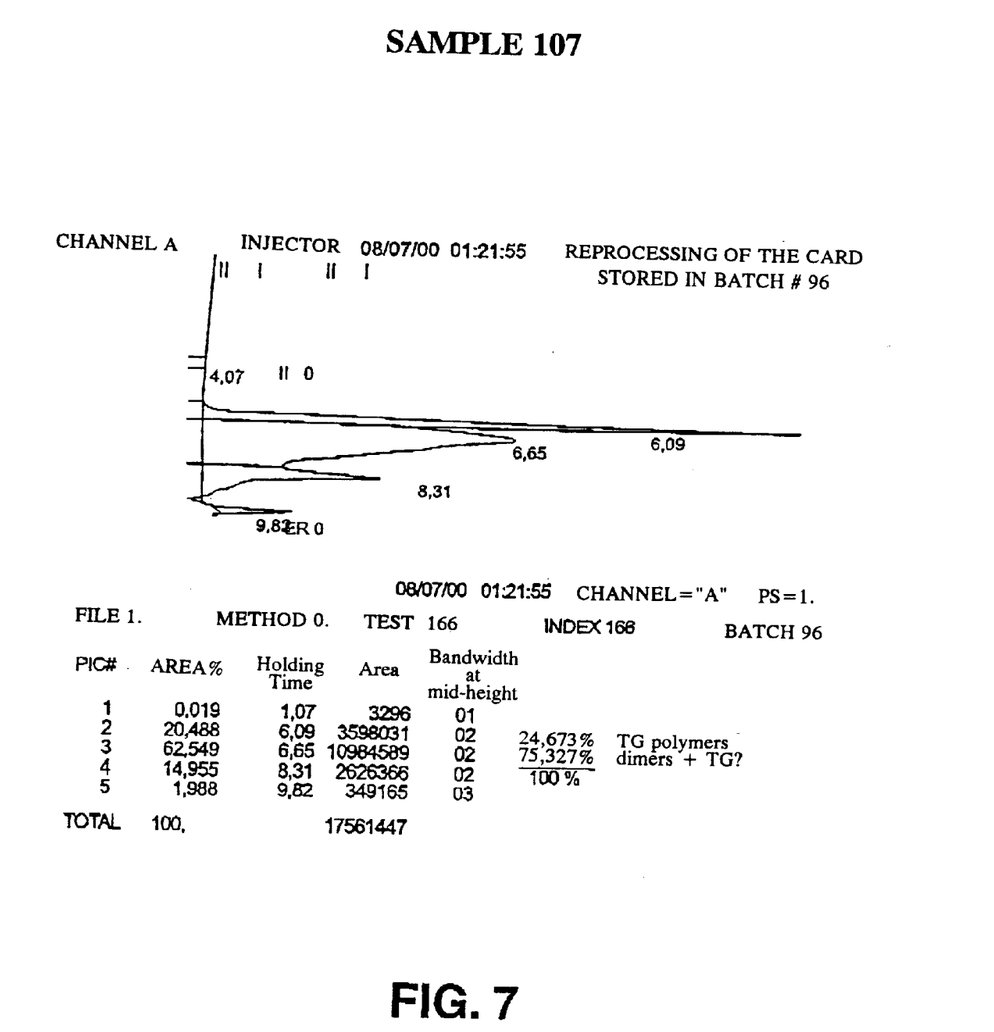
Figure 8:
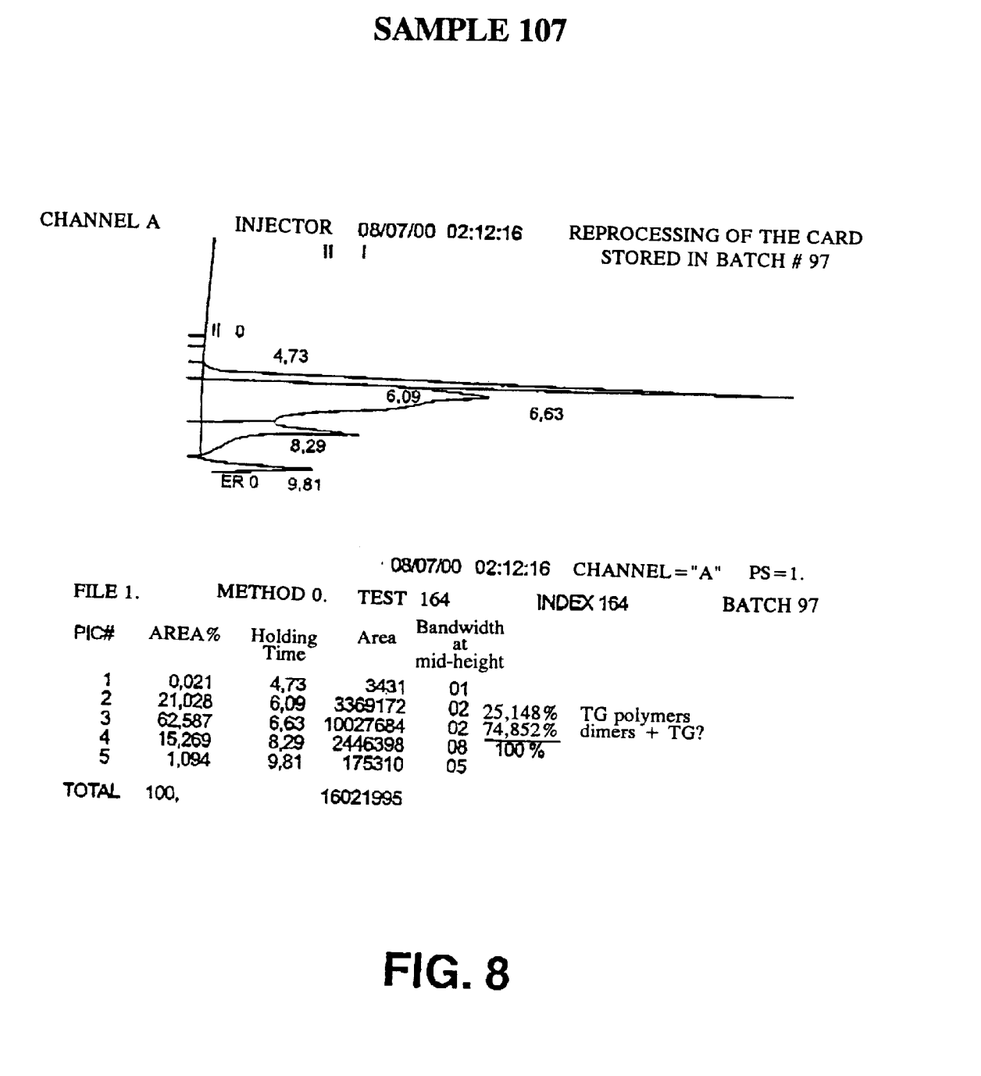
Figure 9:
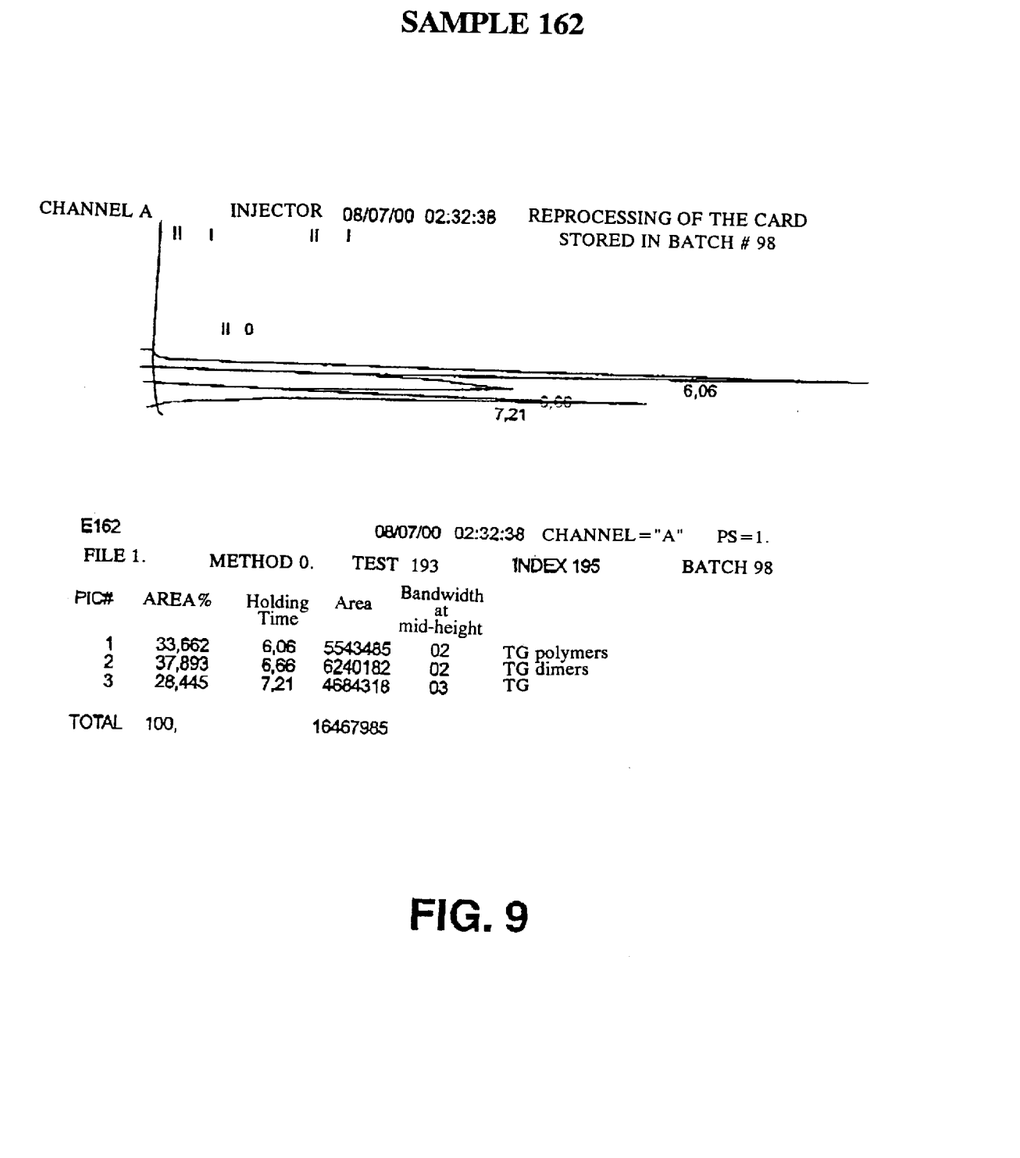
Figure 10:
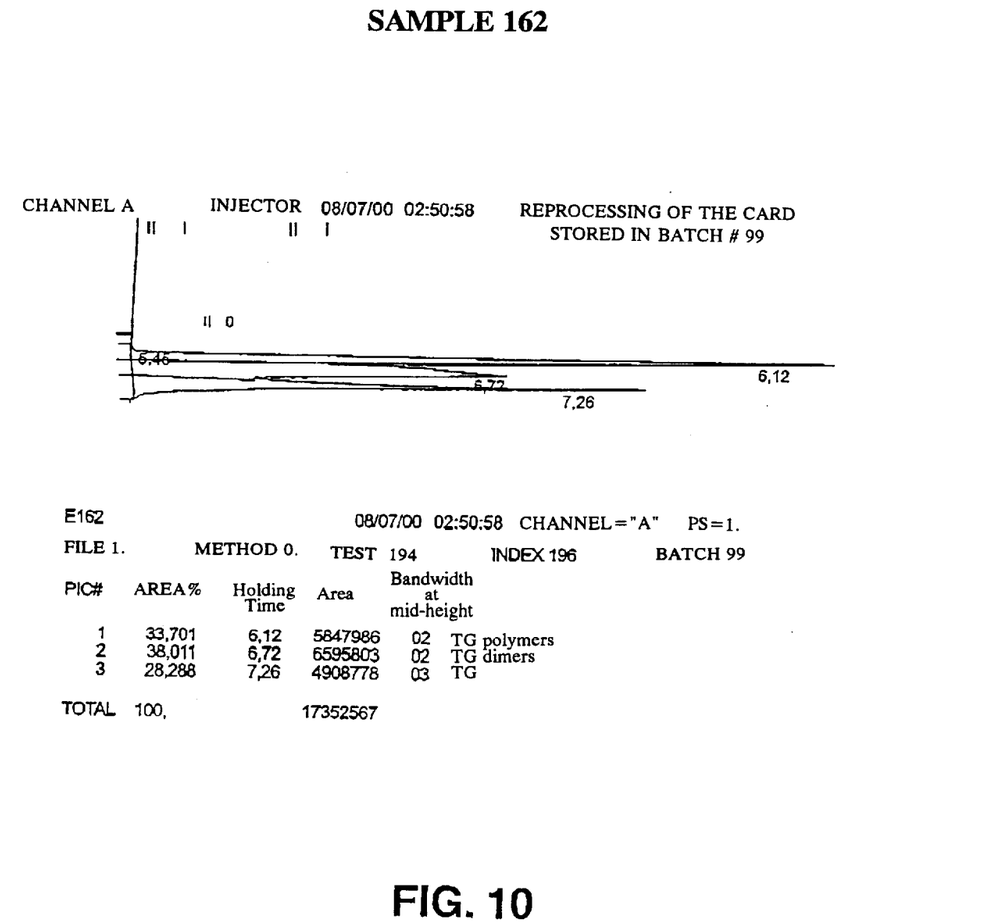
Figure 11:
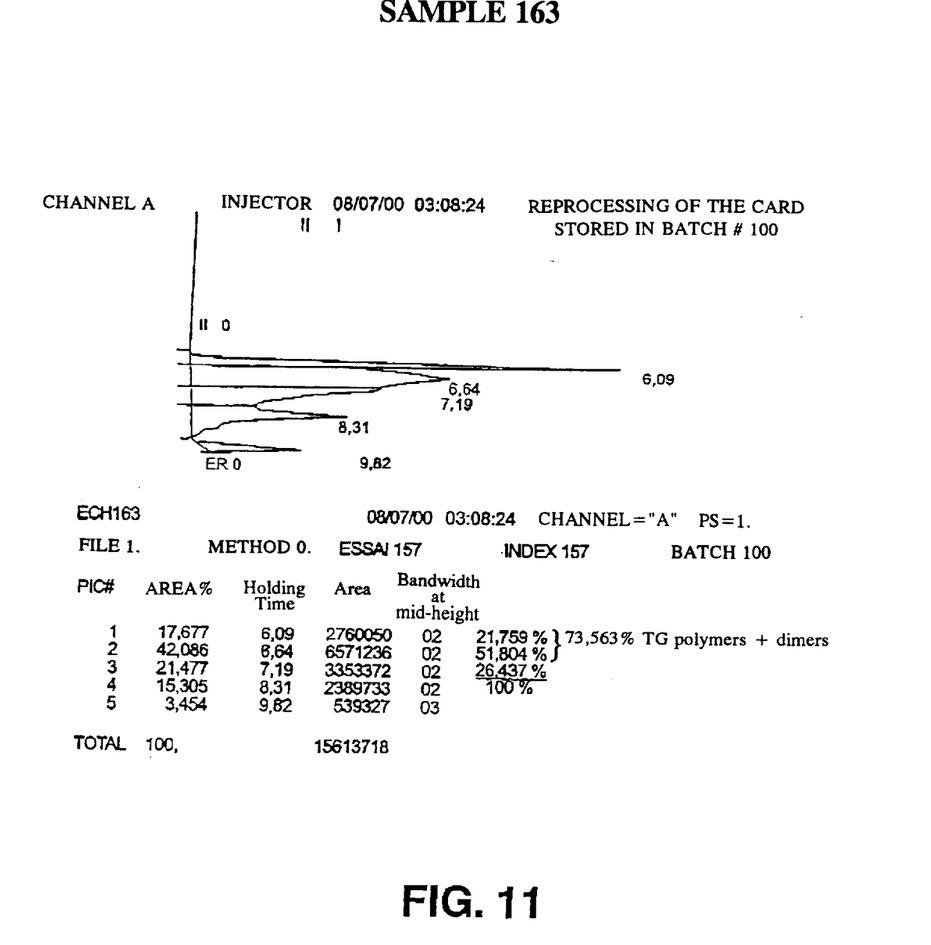
Figure 12:
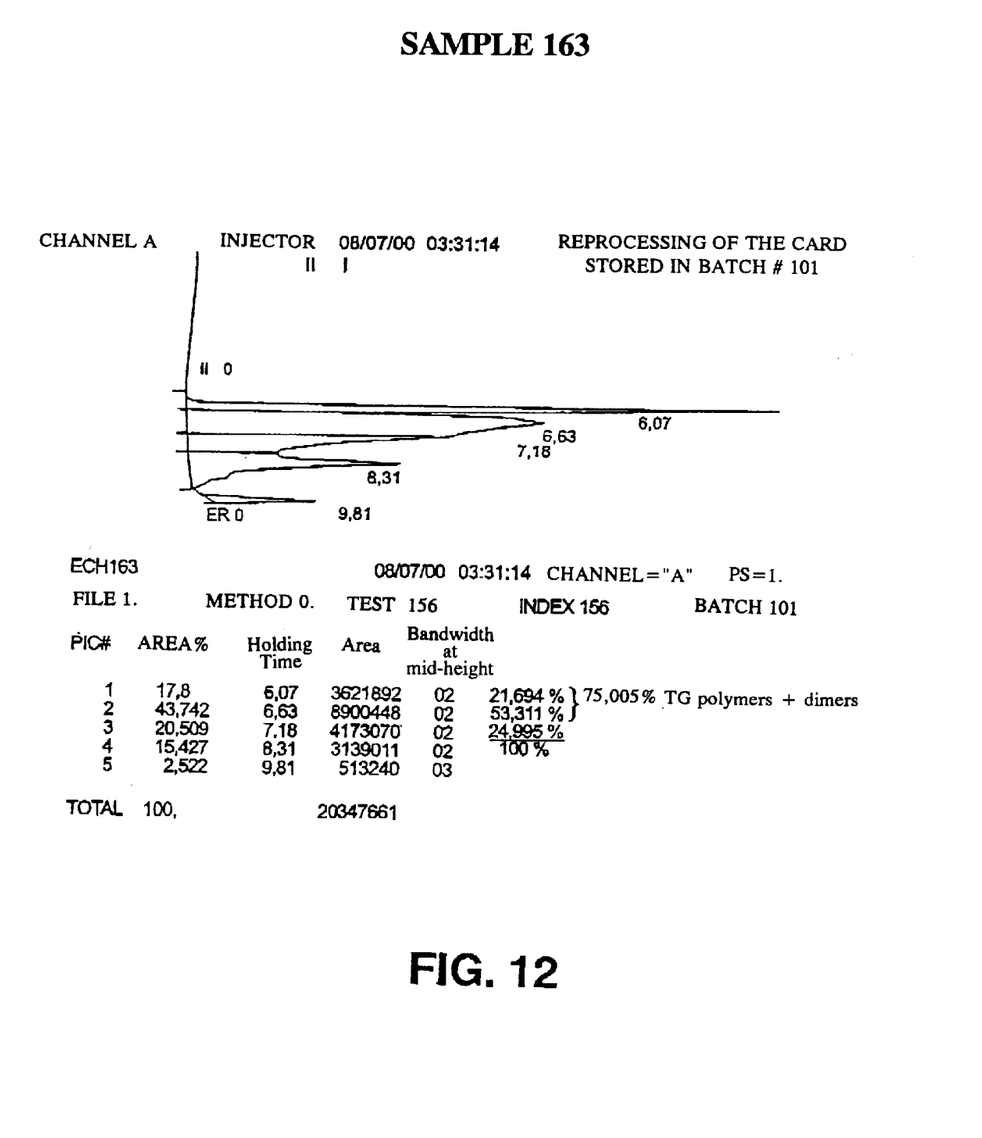

The chromatograms of samples 107 and 163 exhibit an original shoulder at the level of the peak holding time HT=6.65 min.

The IUPAC 2.508 method used for determination of the polymers of triglycerides is perfectly suited for polymers of triglycerides made by means of conventional heating, but not for those produced by means of dielectric heating.

We show here the specific nature of the polymers obtained by the new process.

Qualitative Advantage of the Process
Prevention of "Burn-up":
Conventional heating, that is, heating by conduction, heats a wall which itself heats the product. The temperature gradients are very sizable between the wall and the center, this causing, even without agitation, molecule overheating effects at the level of the walls. The burn-up (beginning of carbonization which may be manifested in a gloss in the case of fats) appears above the smoke point, which depends on the type of product. Sunflower oil has a smoke point of around 150° C. Hence what is witnessed in the case of polymerization of plant oils is fouling of the reaction vessel necessitating significant cleaning effort. This phenomenon is not observed when dielectric heating is applied. In the case of conventional heating, fouling of the reaction vessel increases as an attempt is made to reduce the temperature rise time. This effect is not observed with dielectric heating.

Prevention of Inertia:

All conventional heating is characterized by inertia deriving from the ability of the walls to retain heat. Shutting down the device does not result in simultaneous lowering of the temperature of the reagent. A latency period exists. With dielectric heating, shutting the waves off instantly causes lowering of the temperature of the product.

Quantitative Advantage of the Process

One of the great advantages of using dielectric heating in accordance with this invention is considerable reduction of temperature rise times without occurrence of burn-up effects.

The following experiment was conducted. 33 g of sunflower oil was introduced without agitation into a quartz crucible 40 mm in diameter which was positioned in a waveguide. The sample was subjected to a power of 1,000 w by means of a microwave generator of a frequency of 2.45 Ghz. A fluoroptic thermometer (not interfering with the electromagnetic field) was used, the temperature being measured by means of a fiber optic probe immersed in the oil during the microwave heating. The oil took 75 seconds to heat from 20° C. to 320° C.

The second experiment consisted exclusively of replacing the electromagnetic field in the experiment with a flow of hot air which reached a temperature above 400° C. (474° C. after 3 minutes) at the wall of the crucible. Not only did the oil take 7 minutes and 30 seconds to reach 320° C., but fouling of the crucible wall was observed. This is due to the fact that the temperature gradient is very great inside the crucible. The experiment was repeated without exceeding 377° C. This time the oil took 24 minutes to reach 320° C.

Recapitulation:

| Heating | Product | Conditions | Time of Rise to 300° C. |
|---|---|---|---|
| Micro Wave | 33 g sunflower oil | 1,000 W | 75 s |
| Hot Air | " | 400 to 474° C. | 450 s (×6) |
| Hot Air | " | 200 to 377° C. | 1 440 s (×19) |

Other Raw Materials of Interest

The more the plant oil is polyunsaturated, the faster is the oil polymerization reaction. It may also be of advantage, in order to reduce the reaction time, to use oils with a high percentage of conjugate fatty acids (conjugate dienes or trienes, for example) in a mixture with monounsaturated or polyunsaturated oils. Among such oils one may cite China wood [Tung tree] or tung oil (containing 70 to 80 percent α-eleostearic acid ° C.), oils the linoleic acids of which have been isomerized (sunflower oil isomerized by basic catalysis, for example) so as to obtain a high percentage of conjugate linoleic acids, oils derived from kernels of certain cucurbitaceae (about 20 percent punicic acid), oiticica oil (about 80 percent licanic acid), calendula oil (containing more than 55 percent calendic acid (8t, 10t, 12c—8), or dehydrated castor oil.

The dehydrated castor oil presents the advantage of being obtained on the basis of an oil available in large amounts on the market (the world castor oil production is several hundred thousand tons per year; Source: *Oil World Annual*) and in addition that of its being fairly easy to obtain in comparison to conjugation of oils rich in linoleic acid).

Dehydrated castor oil is obtained by heating castor oil to temperatures of the order of 230 to 250° C. in the presence of acid catalysts.

The applicant has discovered that the heating time required for dehydration of castor oil is reduced by dielectric heating.

The fatty acid composition of castor oil is the following (in percent):

| 16:0 | 18:0 | 18:1 | 18:2 | 18:3 | 18:1 (OH) |
|---|---|---|---|---|---|
| 1 | 1 | 3 | 4 | Trace | 90 |

It contains a preponderance of C18:1 (OH) or ricinoleic acid.

The typical characteristics of the oil are as follows:

|  | No. 1 Castor Oil |
|---|---|
| Density | 0.967–0.961 |
| Saponification Value | 179–185 |
| Iodine value | 82–88 |
| Acid number | 2–3 |
| Gardner color number | 1–2 |
| Viscosity at 25° C. (St) | 6.5–8.5 |

A castor oil whose iodine value was 85 was used for the comparative experiment.

The following materials and equipment were used:

|  | Dielectric Heating | Conventional Heating |
|---|---|---|
| Reagent | Quartz, 100 ml | Glass, 100 ml |
| Equipment | Prolabo Synthewave ™ 402 | Heating flask with electric resistor |

75 ml No. castor oil are mixed with 4 percent by weight Montmorillonite K10. The agitation speed is 120 rpm. Ambient temperature rises to 230° C. in 20 minutes in a nitrogen atmosphere; the temperature is then held at 230° C. in a vacuum for 200 minutes for conventional heating and 80 minutes for dielectric heating. The products obtained are filtered and analyzed.

Comparative Results:

| Heating Method | N2 then vacuum | Catalyst | Temperature (° C.) | Temps. (min.) | Viscosity (St. at 25° C.) | Iodine Value (g1 2/100 g) | Acid Number (mg KOH/g) |
|---|---|---|---|---|---|---|---|
| Dielectric | Yes | 4% Montmorillonite K10 | 230 | 80 | 3.4 | 134 | <12 |
| Conventional | Yes | 4% Montomorillonite K10 | 230 | 200 | 4.7 | 117 | <9 |

When the castor oil is dehydrated, the viscosity decreases and the iodine value increases. This experiment shows that dehydration of castor oil proceeds more rapidly by dielectric heating that by conventional heating. Two hours of reaction time were gained for a better result.

This castor oil dehydrated by dielectric heating may then be used for polymerization with a monounsaturated or polyunsaturated plant oil such as rapeseed oil or sunflower oil. Copolymers of very high viscosity are thereby obtained in one hour in an inert atmosphere.

The invention also relates to the polymers thereby obtained and to their applications in dermatology and cosmetology or for preparation of additive, especially for lubricants, plastics, rubber, and the like.

The invention also relates to the dermatologic or cosmetic products thereby obtained or to products containing at least one such polymer, and to the additives referred to, especially for lubricants, plastics, rubber, and the like.

Lastly, the invention relates to industrial products containing at least one such additive.

This invention has been described for explanatory and not restrictive purposes. Any advantageous change could, of course, be made in it without exceeding its scope.

What is claimed is:

1. A process of polymerization of unsaturated fatty acids, esters of unsaturated fatty acids, unsaturated hydrocarbons, and unsaturated derivatives of these compounds, characterized in that the reagent or reagent mixture is subjected to dielectric heating in order to effect polymerization.

2. A process as specified in claim 1, wherein such heating is effected by use of microwave frequencies.

3. A process as specified in claim 1, wherein such heating is effected by use of radio frequencies.

4. A process as specified in claim 1, wherein the process is conducted with or without catalysts.

5. A process as specified in claim 1, wherein the reagents are fatty acids, esters of fatty acids, plant or animal oils, hydrocarbons of polyterpene or polyisobutene, or derivatives of these products, wherein the reagents include at least one unsaturated compound, used singly or in mixture.

6. A process as specified in claim 1, wherein the reagents are selected from among unsaturated plant or animal oils whose unsaturated compounds are or are not conjugate.

7. A process as specified in claim 1, wherein heterogenous or homogenous catalysts are added to the reagent or reagent mixture.

8. A process as specified in claim 1, wherein catalysts responding to radio frequencies or to microwave frequencies are added to the reagent or reagent mixture.

9. A process as specified in claim 1, wherein the reagent or reagent mixture, and optionally the catalyst or catalysts, is or are introduced into a reaction vessel of the batch or discontinuous type in order to receive microwave frequencies or radio frequencies.

10. A process as specified in claim 1, wherein the reagent or reagent mixture, and optionally the catalyst or catalysts, is or are introduced into a reaction vessel suitable for causing reactions to take place continuously.

11. A process as specified in claim 2, wherein the frequencies range from around 30 Ghz to around 300 MHz.

12. A process as specified in claim 11, wherein the frequencies are 2.45 Ghz or 915 MHz.

13. A process as specified in claim 3, wherein the frequencies range from around 300 MHz to around 3 MHz.

14. A process as specified in claim 13, wherein the frequencies are 13.56 MHz or 27.12 MHz.

15. A process as specified in claim 1, wherein the temperature to which the reagent or the reagent mixture, and optionally the catalyst or catalysts, is or are subjected ranges from 200 to 400° C.

16. A process as specified in claim 1, wherein the temperature rise time selected ranges from 3 to 60 minutes.

17. A process as specified in claim 1, wherein the reaction time ranges from 15 minutes to 15 hours.

18. A process as specified in claim 1, wherein polymerization is conducted in a normal atmosphere or one rich in oxygen or in an inert atmosphere under reduced pressure, the atmosphere being renewed at regular intervals.

19. A process as specified in claim 1, wherein polymerization is halted by chilling or rechilling the reagent or reagent mixture to a temperature below the polymerization temperature, as determined by a pre-selected viscosity.

20. A process as specified in claim 1, wherein neutralization of acidity is effected by adding additional agents, singly or in combination.

21. A process as specified in claim 1, wherein deodorization is effected by steam distillation.

22. A process as specified in claim 1, wherein reduction of the moisture content is carried out before or after polymerization.

23. A process as specified in claim 1, wherein the moisture content is reduced by dielectric heating at a temperature ranging from 100° C. to 220.

24. A process as specified in claim 1, wherein decolorization of the products obtained is undertaken.

25. A process as specified in claim 1, wherein squalene is polymerized.

26. A process as specified in claim 6, wherein the unsaturated plant or animal oils are selected from the group consisting of rapeseed oil, sunflower oil, soybean oil and castor oil.

27. A process as specified in claim 8, wherein the catalysts are montmorillonite.

28. A process as specified in claim 15, wherein the temperature ranges from 220 to 350° C.

29. A process as specified in claim 16, wherein the temperature rise time selected ranges from 3 to 20 minutes.

30. A process as specified in claim 17, wherein the reaction time ranges from 15 minutes to 360 minutes.

31. A process as specified in claim 30, wherein the reaction time ranges from 15 minutes to 120 minutes.

32. A process as specified in claim 18, wherein the reduced pressure is between 50 and 10 mm of mercury.

33. A process as specified in claim 20, wherein the additional agents are selected from the group consisting of alcohols, epoxides, glycidol esters and hydroxides.

* * * * *